United States Patent [19]

Hussels et al.

[11] 4,438,823

[45] Mar. 27, 1984

[54] LOAD CELL

[75] Inventors: Bernard H. Hussels, South Burlington; Charles T. Goetz, Shelburne, both of Vt.

[73] Assignee: DBI Industries, Inc., South Burlington, Vt.

[21] Appl. No.: 406,708

[22] Filed: Aug. 9, 1982

[51] Int. Cl.³ .................. G01G 3/00; G01G 21/23
[52] U.S. Cl. .................. 177/210 EM; 73/862.64; 177/229
[58] Field of Search .................. 177/210 EM, 229; 73/862.64

[56] References Cited

U.S. PATENT DOCUMENTS

| | | | |
|---|---|---|---|
| 3,080,936 | 3/1963 | Sher | 177/229 X |
| 3,371,526 | 3/1968 | Fathauer | 73/862.64 |
| 4,287,776 | 9/1981 | Johnson | 73/862.52 |

*Primary Examiner*—Joseph W. Hartary
*Attorney, Agent, or Firm*—Brady, O'Boyle & Gates

[57] ABSTRACT

A load cell is disclosed which in its full operating range entirely eliminates the effects of off-center loading and lends itself to simplicity and economy in manufacturing. The core element of a linear variable differential transformer employed to measure spring deflection is adjustable with precision on two orthogonal axes. Two circular cross section cantilever arms or springs which carry the movable load-receiving member are anchored to a fixed support member in a common vertical plane through the center axis of the linear variable differential transformer and through the support for the core of such transformer which is connected to the movable load-receiving member. State of the art precision weight range indicating means is utilized.

14 Claims, 11 Drawing Figures

LOAD CELL

BACKGROUND OF THE INVENTION

A number of prior art load cells lay claim to the ability of being less sensitive or compensating for off-center loading. Such devices vary in their configurations and in the degrees of success in meeting the objective.

The present invention seeks to provide a load cell which eliminates entirely sensitivity to off-center loading within the operational range for which it is designed, rather than merely compensating for or reducing the effects of such loading. This objective is realized in the invention through a very simplified structure which lends itself to convenient lower cost manufacturing and in which the spring movement sensing element of the load cell is easily calibrated on two orthogonal axes to assure precision operation. The essence of the invention resides in the use of two circular cross section cantilever springs which are mounted in a common vertical plane with the center axis of the movement sensing device, in this case a linear variable differential transformer (LVDT) having a movable and adjustable core element.

Other advantageous features of the invention will become apparent to those skilled in the art during the course of the following detailed description.

BRIEF DESCRIPTION OF THE DRAWINGS

FIG. 7 is a perspective view showing a modified embodiment of the invention.

DETAILED DESCRIPTION

Figure 1:
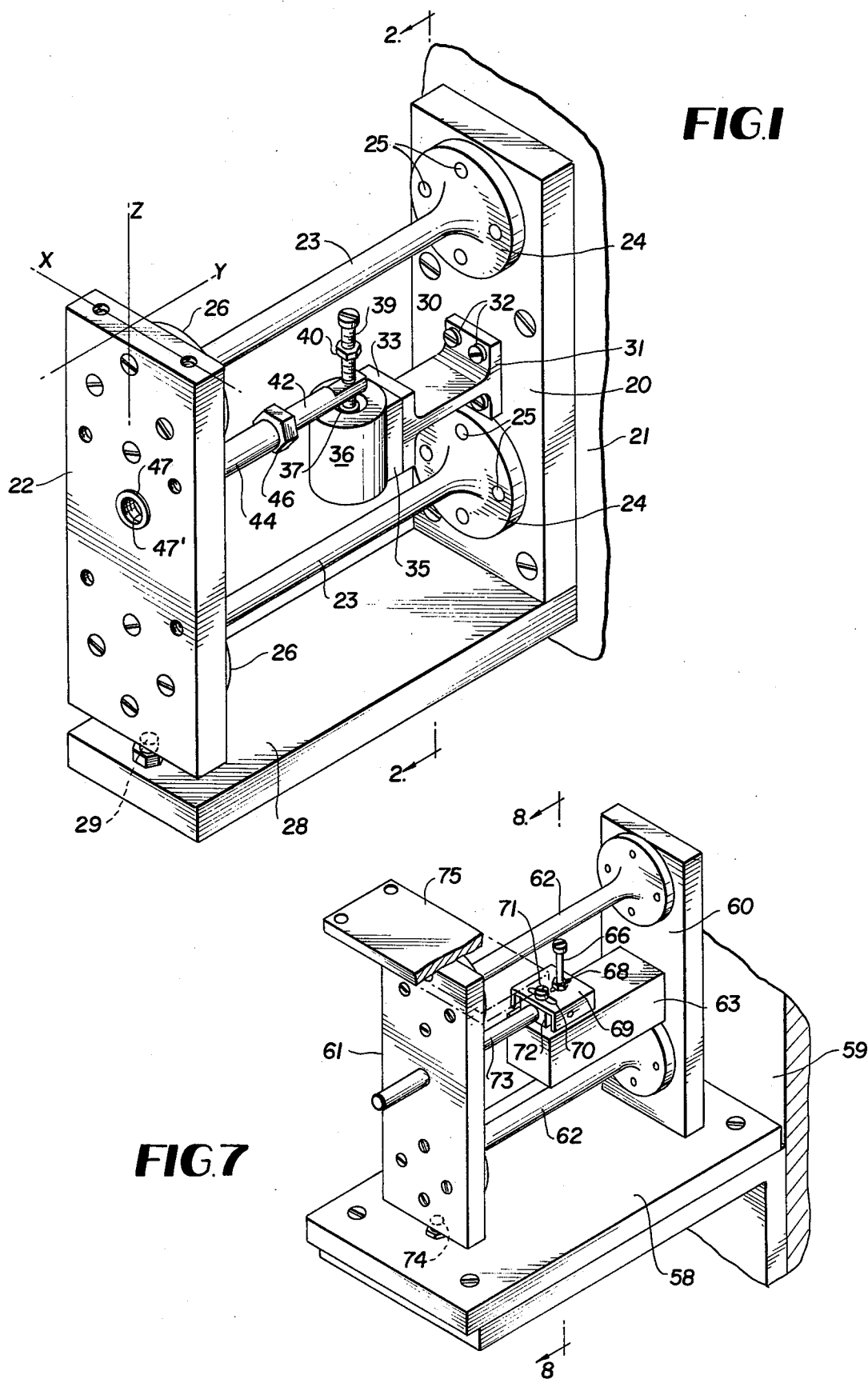
FIG. 1 is a perspective view showing one embodiment of the invention.
Figure 2:
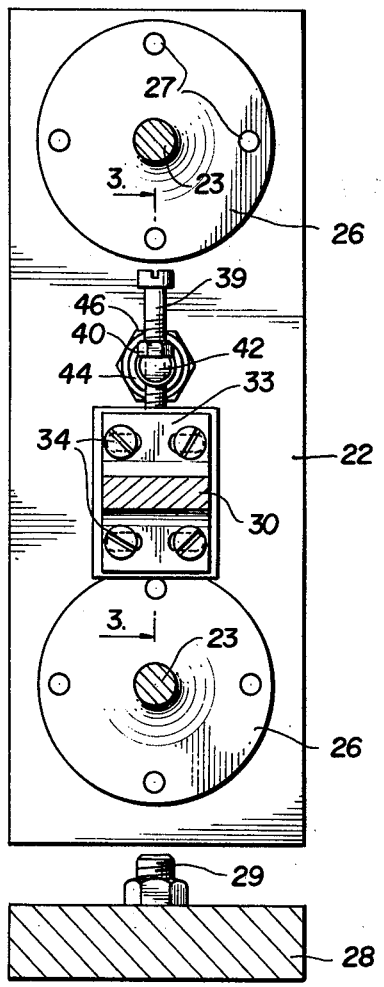
FIG. 2 is an enlarged vertical section taken on line 2—2 of FIG. 1.
Figure 4:
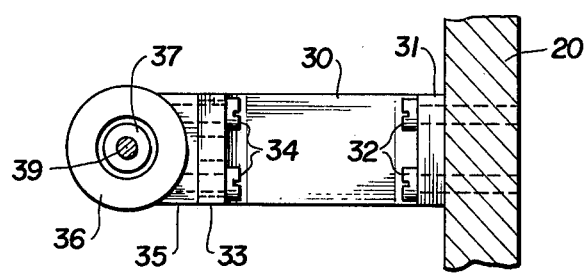
FIG. 4 is a horizontal section taken on line 4—4 of FIG. 3.

Referring to the drawings in detail wherein like numerals designate like parts and referring initially to FIGS. 1 through 6, a cantilever type load cell comprises a vertical plate 20 attached rigidly to an adjacent support surface 21. A movable vertical plate 22 adapted to bear a load is disposed in spaced parallel relationship to the fixed plate 20. A pair of identical circular cross section cantilever spring arms 23 have integral discs 24 at corresponding ends thereof rigidly anchored as at 25 to the fixed plate 20. At their far ends, the spring arms 23 have similar integral discs 26 anchored at 27 to the movable plate 22. The spring arms 23 are of uniform circular cross section throughout their lengths between the pairs of discs 24 and 26. The diameters of the spring arms 23 and their lengths will vary depending upon the size and load-bearing capacity of the load cell.

A horizontal base plate 28 is suitably fixed at the bottom of plate 20 and extends away from this plate to a point below the bottom of movable plate 22 in spaced relationship with the latter. An adjustable overload stop 29 for the movable plate 22 is secured to the stationary base plate 28, as shown.

A rigid mounting bracket 30 is disposed between the two spring arms 23 and has one end vertical web 31 thereof anchored by screws 32 to the fixed plate 20. The opposite end vertical web 33 of bracket 30 is attached by similar screws 34 to a coil mounting plate 35 having an arcuate seat for a vertical axis coil 36 of a vertical axis LVDT employed to measure deflection of the spring arms 23 of the load cell. The vertical axis of the transformer coil 36 lies in a common vertical plane with the parallel horizontal axes of the two spring arms 23. A coacting core element 37 of the LVDT is disposed within the bore of coil 36 in spaced concentric relationship with the coil for constrained axial vertical movement therein.

Figure 3:
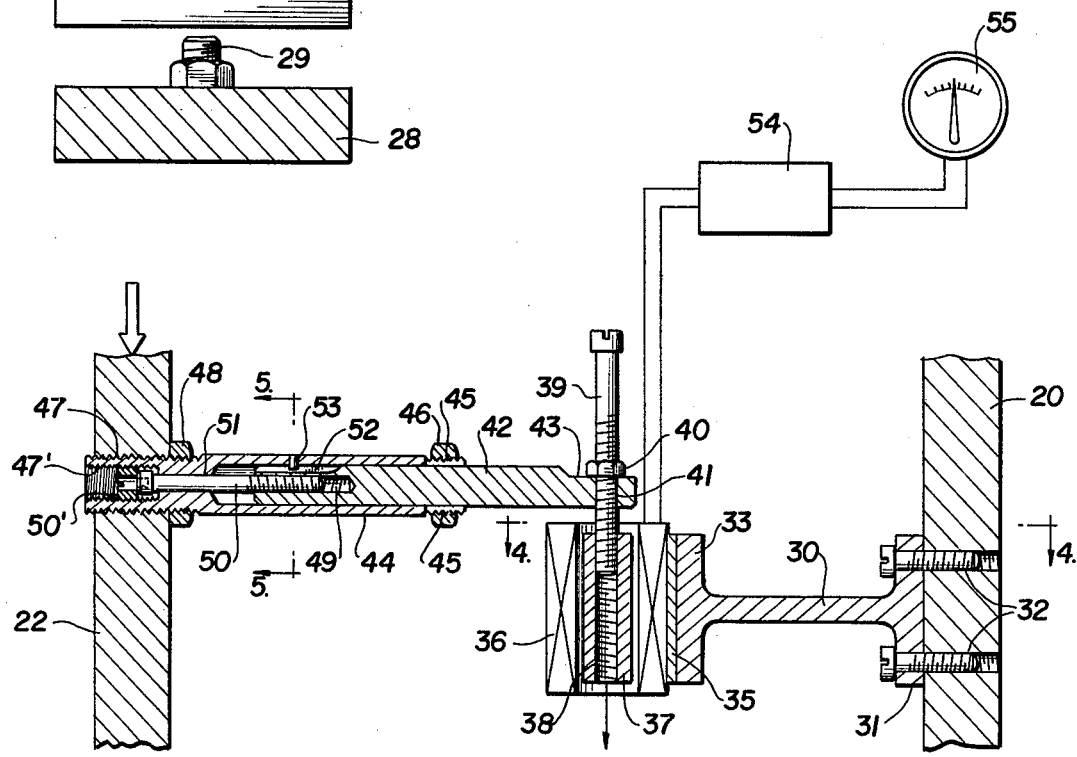
FIG. 3 is a fragmentary vertical section taken on line 3—3 of FIG. 2.

The core element 37 has a threaded bore 38 engaged with a core element adjusting screw 39 carrying a lock nut 40. The adjusting screw 39, which is coaxial with the core element 37, is received in a threaded opening 41 of a support bar 42 having a flat upper surface 43 against which the lock nut 40 can be seated following proper adjustment of the core element 37 to a neutral position in the coil 36, as shown in FIG. 3. The support bar 42 is received adjustably in the bore of a horizontal axis support sleeve 44 having split jaws 45 at one end thereof which are externally threaded to receive a clamping nut 46. The other end of the sleeve 44 is externally screw-threaded at 47, which end is received in a threaded opening of the movable plate 22 and secured by a lock nut 48. The support bar 42 has a threaded opening 49 in its interior end receiving a fine adjusting socket head cap screw 50 engaged rotationally in a reduced center bore 51 of the sleeve 44. The support bar 42 has a longitudinal keyway 52 preventing its rotation in the sleeve 44, a key element 53 on the sleeve 44 being engaged in the keyway 52. The head of screw 50 engages against the bottom of internally threaded counter bore 47' and a set screw 50' with a hex through hole is threaded in the bore against the head of screw 50 to function as a locking mechanism as well as a stop for screw 50. Backing off screw 50, with a socket wrench extending through set screw 50' against the set screw will adjust bar 42 and core element 37 forward.

The horizontal axis of the adjustable support bar 42 is parallel to the axes of spring arms 23 and in a common plane therewith, at right angles to the axis of adjustable core element 37. It can be seen that this core element can be adjusted with precision on both the Y and Z axes and does not deviate on the X axis.

The load cell employing the LVDT is used with any precision high quality electronic equipment 54 which measures spring deflection or movement responsive to an electrical signal from the LVDT in a well-known manner. The weight range which the load cell can accommodate causing deflection of the spring arms 23 within the limits of the load cell can be directly read on a conventional instrument dial 55.

Figure 6:
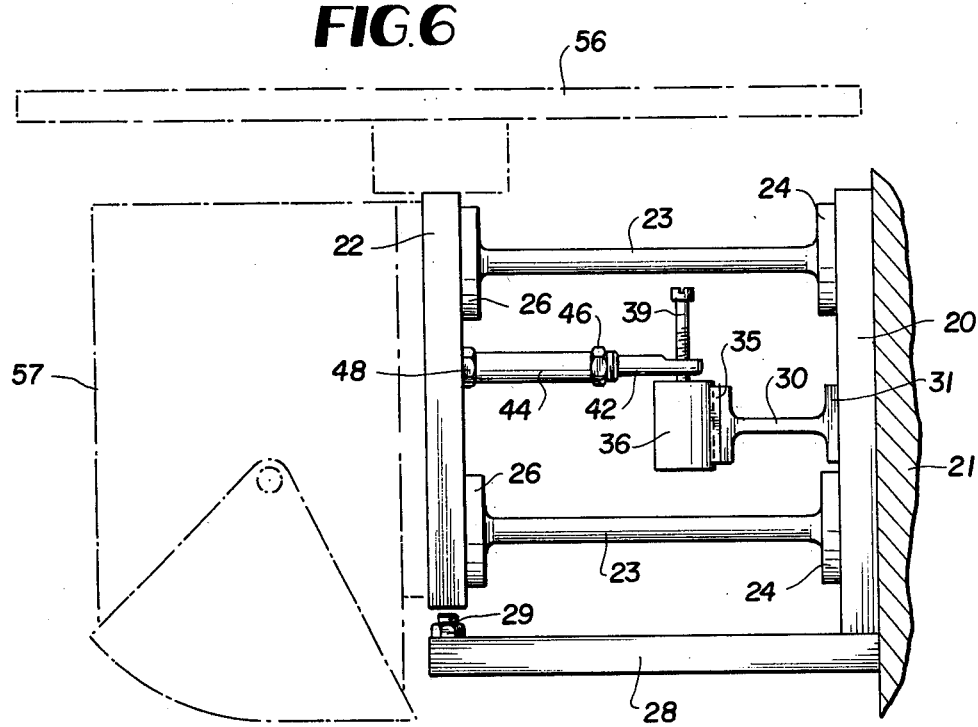
FIG. 6 is a partly schematic side elevation of the load cell in FIG. 1 showing in phantom lines two alternative arrangements for applying a load to the cell.

As shown in phantom lines in FIG. 6, the load cell can be loaded through a horizontal platform 56 suitably attached to movable plate 22, or, alternatively, can be loaded through a hopper 57 attached to the outer side of plate 22.

The load cell as described possesses excellent linearity and repeatability. More importantly, it is completely insensitive to off-center loading on the platform 56 or in the hopper 57, and this applies to off-center loading on either the X axis or the Y axis. It has been discovered through actual laboratory testing that the important insensitivity to off-center loading can be obtained only by using two parallel axis circular cross section spring arms having the same diameters and occupying a common vertical plane with the axis of core support bar 42 and the axis of the core 37 itself.

Figure 9:
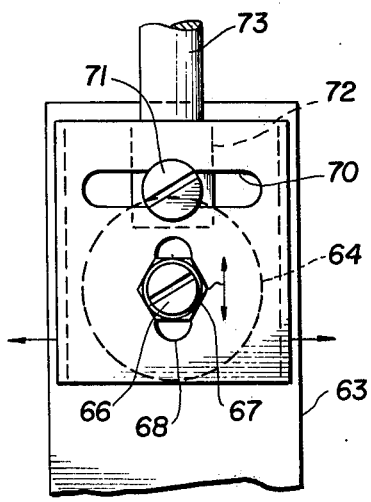
FIG. 9 is an enlarged horizontal section taken on line 9—9 of FIG. 8.
Figure 8:
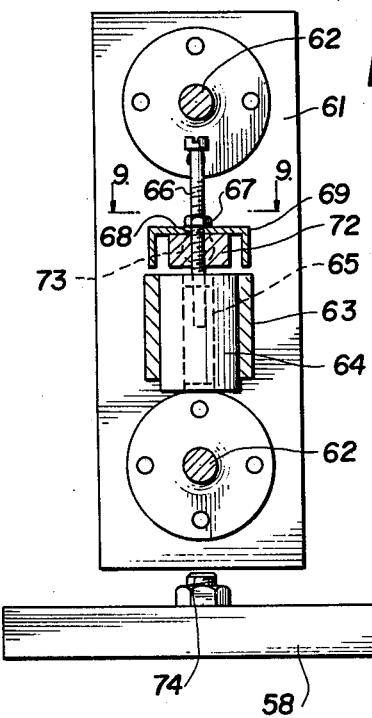
FIG. 8 is a vertical section taken on line 8—8 of FIG. 7.

FIGS. 7 to 9 show a second embodiment of the invention in which a horizontal base plate 58 is solidly supported in cantilevered relationship to a support surface 59. A fixed vertical plate 60 corresponding to the plate 20 rises from the base plate 58 and is anchored thereto. A spaced parallel movable plate 61 is supported somewhat above the base plate 58 by the adjacent ends of two horizontal parallel axis circular cross section equal size spring arms 62 substantially identical to the spring arms 23.

A LVDT mounting block 63 is fixed to the plate 60 and extends inwardly therefrom. This block supports a vertical axis LVDT coil 64 in fixed relationship thereto and within this coil coaxially is a vertical axis core 65, FIG. 8, substantially similar to the core element 37. The core 65 is engaged with a vertical core adjusting screw 66 having a lock nut 67. The vertical axis screw 66 is received through a Y axis adjustment slot 68 formed in the top wall of a support bracket 69 also having an X axis adjustment slot 70. An adjusting and locking screw 71 received through the slot 70 of bracket 69 is engaged threadedly with a block or head 72 on a horizontal support bar 73 firmly anchored to the plate 61. The lock nut 67, when tightened, bears on the top surface of the bracket 69. The axes of support bar 73 and adjustable core 65 are perpendicular and lie in a common vertical plane with the axes of spring arms 62. An overload stop 74 for the load cell is provided on the base plate 58 adjacent to the lower end of moving plate 61. A horizontal load-bearing platform plate 75, FIG. 7, is attached to the top of moving plate 61.

The load cell in accordance with FIGS. 7-9 possesses the same basic advantages including insensitivity to off-center loading as the load cell according to the previous embodiment. The critical core element 65 of the LVDT is adjustable on the Z axis and lockable by means of the screw 66 and is also adjustable on both the X and Y axes by virtue of the slots 70 and 68, respectively.

Figure 11:
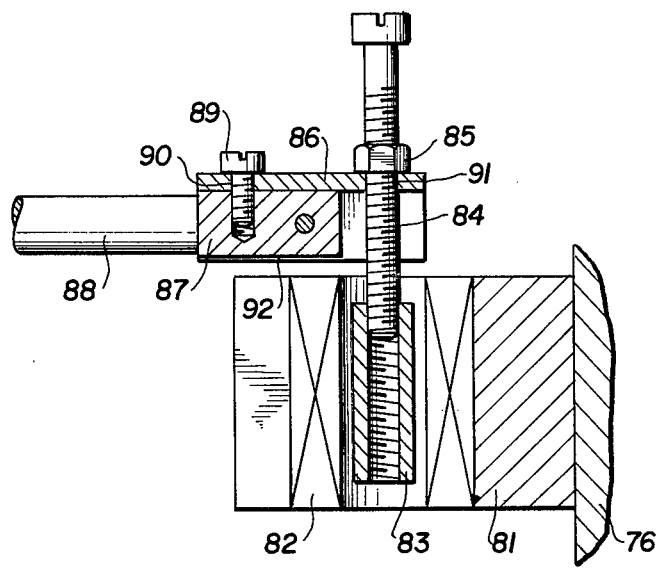
FIG. 11 is an enlarged fragmentary vertical section taken on line 11—11 of FIG. 10.
Figure 5:
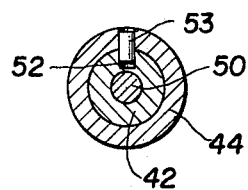
FIG. 5 is an enlarged vertical section taken on line 5—5 of FIG. 3.
Figure 10:
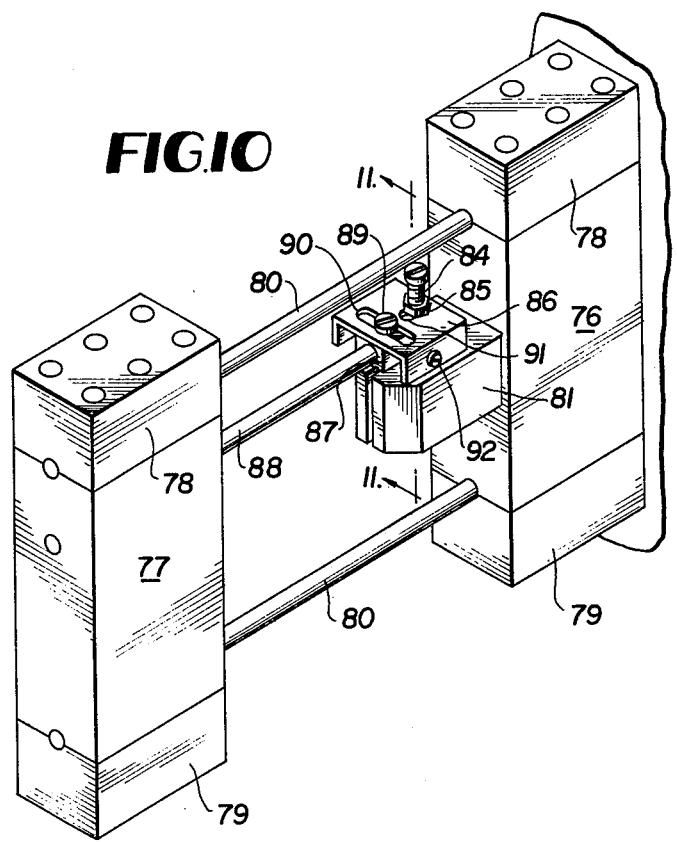
FIG. 10 is a perspective view of another embodiment of the invention.

FIGS. 10 and 11 depict a further embodiment of the invention in which fixed and movable support blocks 76 and 77 have top and bottom detachable pillow blocks 78 and 79 for clamping and securing the opposite ends of two identical circular cross section cantilever spring arms 80 which do not require end mounting discs, as in the prior embodiments. Thus, the spring arms 80 are easier and less expensive to manufacture with the arrangement of FIG. 10.

An LVDT holder 81 is anchored to the block 76 and supports a vertical axis LVDT coil 82 having a coaxial movable core 83 secured to a vertical adjusting screw 84 having a locking nut 85 above a support bracket 86 which is adjustable on both X and Y axes in the manner described in the immediately-preceding embodiment.

The bracket 86 rests adjustably on a head or block 87 secured to a horizontal support bar 88, in turn secured to the block 77. The axes of core 83 and support bar 88 are perpendicular and lie in a common vertical plane with the horizontal spring arms 80. A locking screw 89 for the same purpose as the screw 71 is provided and engages through an X axis adjusting slot 90 of the bracket 86, the screw 84 being engaged through a Y axis adjusting slot 91. The arrangement in FIGS. 10 and 11 possesses the same operational and adjustability features offered by the embodiment in FIGS. 7–9 and these need not be repeated. A fine adjustment screw 92 for the bracket 86 along the X axis can be provided and is operated when the locking screw 89 is loosened.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

We claim:

1. A load cell comprising a stationary support member, a movable load bearing member spaced from the stationary support member, a pair of circular cross section cantilever spring arms secured to the stationary support member and projecting therefrom in spaced parallel relationship in a common vertical plane and connected with and carrying said load bearing member, and a movement sensing and measuring means for the load cell including an element connected with the movable load bearing member.

2. A load cell as defined in claim 1, and said circular cross section spring arms being of the same diameter and having equal lengths between said stationary support member and movable load bearing member.

3. A load cell as defined in claim 2, and the spring arms having attachment bases at their opposite ends adjacent to the stationary support member and movable load bearing member, and means securing the attachment bases to said members.

4. A load cell as defined in claim 1, and an overload limit stop for said movable load bearing member beneath such member.

5. A load cell as defined in claim 2, and clamping block elements at the tops and bottoms of the stationary support member and movable load bearing member, and opposite end portions of the spring arms extending between said clamping blocks and opposing end surfaces of said members and being fixedly clamped therebetween.

6. A load cell as defined in claim 1, and said means comprising a relatively stationary electrical element having a load range indicator, and said first-named element comprising a coacting movable electrical element, and a support for the coacting movable element secured to the movable load bearing member and being adjustable at least on two orthogonal axes relative to said relatively stationary electrical element.

7. A load cell as defined in claim 6, and said relatively stationary electrical element comprising a vertical axis coil of a linear variable differential transformer, a member supporting said coil in fixed relationship to said stationary support member, said coacting movable electrical element comprising a movable core for said transformer disposed coaxially and movably in the bore of said coil.

8. A load cell as defined in claim 7, and said support for the coacting movable element comprising a longitudinally adjustable support arm connected between said movable load bearing member and said coacting movable electrical element, and means to prevent relative rotation between sections of said support arm.

9. A load cell as defined in claim 1, and said movement sensing and measuring means comprising a linear variable differential transformer including a vertical axis coil and a coaxial relatively movable core disposed in the bore of said coil, the vertical axes of the coil and core coinciding and lying in a common vertical plane with the axes of said cantilever spring arms and being perpendicular to the axes of the spring arms when the latter are in a relaxed unloaded state, and a support for the core of said transformer fixed to the movable load bearing member and being adjustable on two orthogonal axes across and longitudinally of the axis of said core.

10. A load cell as defined in claim 9, and said support for the core comprising a longitudinally extensible, retractable and lockable arm extending horizontally across the axis of the core and located between said cantilever spring arms in a common vertical plane therewith, and a support element for the core on said arm and being adjustable on a vertical axis across the horizontal axis of said arm.

11. A load cell as defined in claim 10, and the last-named support element comprising an adjusting screw having threaded engagement with the core.

12. A load cell as defined in claim 9, and said support for the core including a mounting bracket for the core including an arm secured to and extending from the movable load bearing member and lying between said cantilever spring arms in a common vertical plane therewith, and a mounting bracket for the core on said arm and being adjustable horizontally in a horizontal plane on two orthogonal axes and being lockable in a selected adjusted position.

13. A load cell as defined in claim 12, and a carrier element for the core on the mounting bracket and being adjustable with the core on a third orthogonal axis.

14. A load cell as defined in claim 1, and said movement sensing and measuring means comprising a linear variable differential transformer including a vertical axis coil and a coaxial relatively movable core disposed in the bore of said coil, the vertical axes of the coil and core coinciding and lying in a common vertical plane with and perpendicular to the axes of said cantilever spring arms when the latter are in a relaxed unloaded state, first adjustable means connecting said vertical axis coil to said stationary support member for positioning the electrical center of said vertical axis coil in said common vertical plane, and second adjustable means connecting said core with the movable load bearing member for positioning the vertical axis of said core in the electrical center of the bore of said coil and in said common vertical plane.

* * * * *